(12) United States Patent
Singh et al.

(10) Patent No.: US 10,533,808 B2
(45) Date of Patent: Jan. 14, 2020

(54) INVERSE LATENT HEAT THERMAL ENERGY STORAGE SYSTEM, METHOD FOR CAPTURING AND RELEASING LATENT HEAT

(71) Applicants: Dileep Singh, Naperville, IL (US);
David M. France, Lombard, IL (US);
Wenhua Yu, Darien, IL (US)

(72) Inventors: Dileep Singh, Naperville, IL (US);
David M. France, Lombard, IL (US);
Wenhua Yu, Darien, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 15/639,933

(22) Filed: Jun. 30, 2017

(65) Prior Publication Data
US 2019/0003782 A1    Jan. 3, 2019

(51) Int. Cl.
*F24F 11/00* (2018.01)
*F28D 20/02* (2006.01)
*F28D 20/00* (2006.01)

(52) U.S. Cl.
CPC ......... *F28D 20/023* (2013.01); *F28D 20/021* (2013.01); *F28D 20/028* (2013.01); *F28D 2020/0013* (2013.01)

(58) Field of Classification Search
CPC .... F28D 20/023; F28D 20/021; F28D 20/028; F28D 2020/0013

USPC .......................................................... 165/236
See application file for complete search history.

(56) References Cited

U.S. PATENT DOCUMENTS

| | | | |
|---|---|---|---|
| 2003/0015811 A1 | 1/2003 | Klett et al. | |
| 2012/0168111 A1 | 7/2012 | Souhojak et al. | |
| 2014/0033441 A1* | 2/2014 | Morgan | A47C 21/042 5/724 |
| 2015/0204612 A1 | 7/2015 | Sun et al. | |
| 2015/0241137 A1 | 8/2015 | France et al. | |

FOREIGN PATENT DOCUMENTS

EP    84106653.3    12/1984

* cited by examiner

*Primary Examiner* — Davis D Hwu
(74) *Attorney, Agent, or Firm* — Cherskov Flaynik & Gurda, LLC

(57) ABSTRACT

The invention provides a method for storing and releasing heat having the steps of thermally contacting thermal transfer fluid to a mixture of foam and phase change material for a time sufficient for the material to change from a first phase to a second phase during a time when electricity rates are at a first price point; maintaining said material in the second phase until electricity rates are at a second point, wherein the second point is higher than the first price point; and thermally contacting the thermal transfer fluid to the composite in the second phase for a time sufficient for the material to change from the second phase to the first phase. The invention also provides an energy storage module having a mixture of phase change material and high surface area substrate

11 Claims, 6 Drawing Sheets
(2 of 6 Drawing Sheet(s) Filed in Color)

INVERSE LATENT HEAT THERMAL ENERGY STORAGE SYSTEM, METHOD FOR CAPTURING AND RELEASING LATENT HEAT

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to energy storage and more specifically, this invention relates to a device and method for storing and transporting heat.

2. Background of the Invention

Smart metering is becoming more mainstream for residential electricity customers. This allows those customers to take advantage of lower rates when powering electric appliances, recharging battery storage banks, and regenerating ice storage from chillers or direct expansion (DX) air conditioning systems.

Heretofore, chillers and DX systems embodying stored ice technology have been utilized to take advantage of low electricity rates. But these electricity rates are usually relegated to contracts between the power company and its large industrial customers.

The advent of smart metering has the potential of making ice storage technology economical to residential users. Air conditioners can use energy to freeze large volumes of water during off-peak hours, then utilize that thermal bank during peak hours to cool the home. Unfortunately, initial ice formation inhibits the formation of additional ice, given the insulative characteristics of that initial ice. This feature makes the ice formation process inefficient, and commercial users, who have had access to low night electric rates for many years, have barely used the technology.

A need exists in the art for an efficient method and device for transporting and storing heat from a thermodynamic perspective. The method and device should eliminate the problems of state of the art ice storage systems in that efficiencies of several magnitudes higher than state of the art systems are realized. The method and device should be compact and modular to facilitate installation in home and industry and easily repairable.

SUMMARY OF INVENTION

An object of the invention is to provide a low cost method and system for heat storage and transfer. A feature of the invention is that it comprises a plurality of self-containing phase changing modules. An advantage is its flexibility in that the invention can be customized for each application, whereby modules can be added or subtracted and all the same or different modules can be applied to the same system.

Yet another object of the invention is to provide a method and system for storing and transporting heat that overcomes many of the drawbacks of the prior art. A feature of the invention is that it utilizes a PCM/foam combination as the energy storage medium. Two advantages of the invention are that it has a large energy storage capacity to volume ratio and a fast charging/discharging rate. For example, using the latent heat of fusion of water as the PCM, the energy storage capacity to volume ratio can be increased by a factor of 10 over sensible heat storage in the solid or liquid state alone. In addition, using a high porosity, high thermal conductivity foam material with the water can increase the charging/discharging rate by a factor of four compared to state of the art systems.

Another object of the present invention is to provide an inverse, modular, low temperature latent heat thermal energy storage system. A feature of the invention is that during charging, heat is removed from storage, resulting in a cold solid storage system of about 32° F. Another feature of the invention is that during discharging mode, heat is added to storage resulting in a cold liquid storage system. An advantage of the system is that discharge may occur at a later time than charging. Rejecting heat during charging and adding heat during discharging is an inverse usage compared to more conventional thermal storage applications.

Still another object of the invention is to provide an economical compact system and method for storing and utilizing latent heat for residential and commercial applications. A feature of the invention is the combination of phase change material with highly thermal conductive foam material. An advantage of the invention is that it provides for fast charging/discharging of an air conditioning system in small volume. For example, the invention confers efficiencies of 400 percent above typical ice storage systems in air conditioning scenarios.

Briefly, the invention provides a method for releasing then adding heat, the method comprising heat transfer to a fluid from a mixture of foam and phase change material for a time sufficient for the material to change from a first phase to a second phase during a time when electricity rates are at a first price point; maintaining said material in the second phase until electricity rates are at a second point, wherein the second point is higher than the first price point; transferring heat from the fluid to the composite in the second phase for a time sufficient for the material to change from the second phase back to the first phase.

Also provided is a phase change composite comprising a mixture of phase change material and high surface area foam. The substrate/foam can have a high porosity (e.g., about 80 to 90 percent) which minimizes the cold storage component volume. Computer simulations have shown foam porosities of 80 to 90% to be effective in conducting heat to PCM within the pores. The high porosity also provides a means for minimizing the size and weight of the modules, thereby minimizing costs.

BRIEF DESCRIPTION OF DRAWING

The patent or application file contains at least one drawing executed in color. Copies of this patent or patent application publication with color drawing(s) will be provided by the Office upon request and payment of the necessary fee.

The invention together with the above and other objects and advantages will be best understood from the following detailed description of the preferred embodiment of the invention shown in the accompanying drawings, wherein.

DETAILED DESCRIPTION OF THE INVENTION

Figure 1:
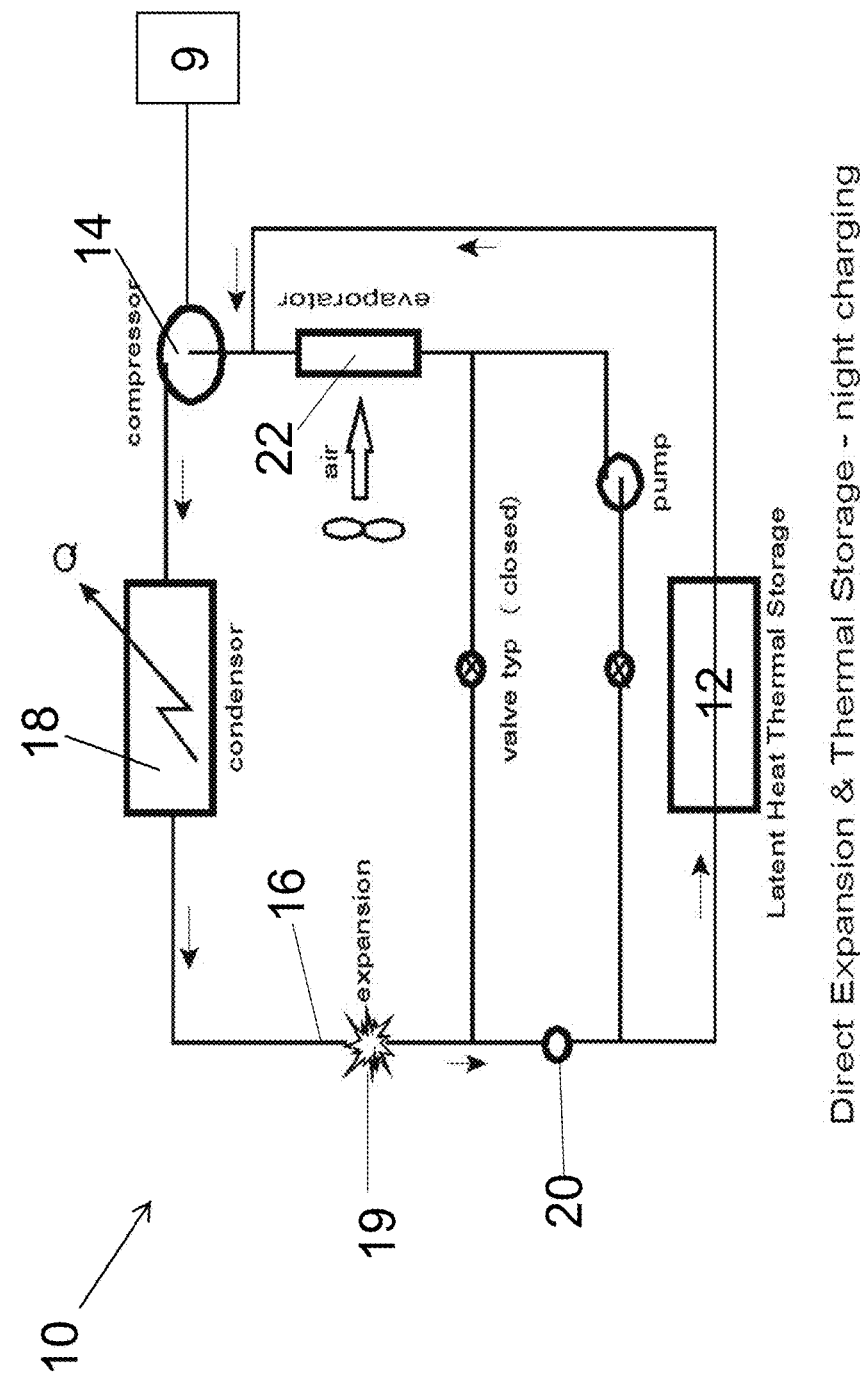
FIG. 1 is a schematic of a low temperature latent heat thermal storage system in charging mode, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides an inverse heat storage system. It is an inverse heat storage system in the sense that when a phase change material (PCM) such as water is solidified into ice, heat is rejected creating a cold storage component. The usefulness of the cold storage component occurs at a later time when heat is added, melting the ice, and providing sought after cooling. This process is the inverse of more conventional thermal storage systems that add heat initially and reject it from the storage component at a later time providing sought after heating.

Salient components of the invented system include a phase-change material (PCM/foam combination) to store energy, a charging and discharging pipe subsystem, the containment, and the thermal insulation structure.

A salient feature of the invention is its PCM/foam energy storage module. This module improves building space cooling system efficiency via the following attributes:

Small low-temperature size due to using the latent heat of fusion of a phase change material;

Large energy transfer during the night time charging process and during the daytime discharging process, leading to the reduced day time load and maximum capacity of the building space cooling system;

Part-load instead of full-load operation of the building space cooling system. (Depending on the percent of building air conditioning load stored, the building space cooling system may be run at, or installed for, partial building load rather than full load; thus reducing the size and cost of the building space cooling system); and Operation of the overall building space cooling system under a balanced load of day time and night time.

FIG. 1 is a schematic diagram of the invented modular, low temperature, latent heat, thermal energy storage system utilizing an existing direct expansion building space cooling system (air conditioning system), designated as numeral 10, in night charging mode. As such, a compressor 14, condenser 18, expander 19, and evaporator 22 shown therein comprise a standard DX air conditioning system. The invented modular, low-temperature latent heat thermal energy storage system is comprised of this air conditioning system (DX, chiller or absorption) and a latent heat thermal storage component 12 containing storage media modules 26.

In FIG. 1, the system is shown charging the thermal storage component and not air conditioning the building, but the two operations can be done simultaneously. FIG. 1 depicts one possible night charging configuration incorporating a DX system in which three valves cause the refrigerant to flow to the latent heat thermal storage component 12. Alternatively, chiller or absorption systems can be incorporated in place of the DX system. The three valves change from charging to discharging (FIG. 2) modes. The DX system is typically above 1 atm throughout with high pressure (~250 psi) from the compressor output to the expander input and low pressure (~40 psi) elsewhere downstream, including in the storage media component 12. Refrigerant pressure is reduced significantly as it flows through the expander 19, thereby reducing refrigerant temperature to a level necessary to cool building air.

During the night charging process, the latent heat thermal storage component or storage media component 12 acts as the system evaporator and solidifies phase change material stored therein in an evaporative cooling process. Expanding, evaporating refrigerant (such as Freon, boiling below 32° F.) circulating through the system's loop 16 and the storage media component 12 draws heat from the module. As heat Q is removed in this mode, ice forms and is stored in the storage media component 12.

A compressor 14 is powered by an energy source 9 so as to subsequently pressurize the refrigerant confined to the loop 16. As such, the loop 16 is in fluid communication with both the compressor 14 and the storage media component 12.

A condenser 18 also in fluid communication with the loop 16, is placed downstream of the compressor 14 and upstream of the storage media component 12. As such, the condenser 18 is positioned intermediate the compressor and the storage media component 12. To maintain fluid communication between the condenser 18 and the storage module during charging mode, a valve 20 is disposed (and maintained in the open position) within the loop, downstream of the condenser and upstream of the storage media component 12.

The now evaporated yet still confined heat transfer fluid in the loop exits the downstream end of the storage media component 12 to be recompressed by the compressor, thereby repeating the whole charging process.

Figure 2:
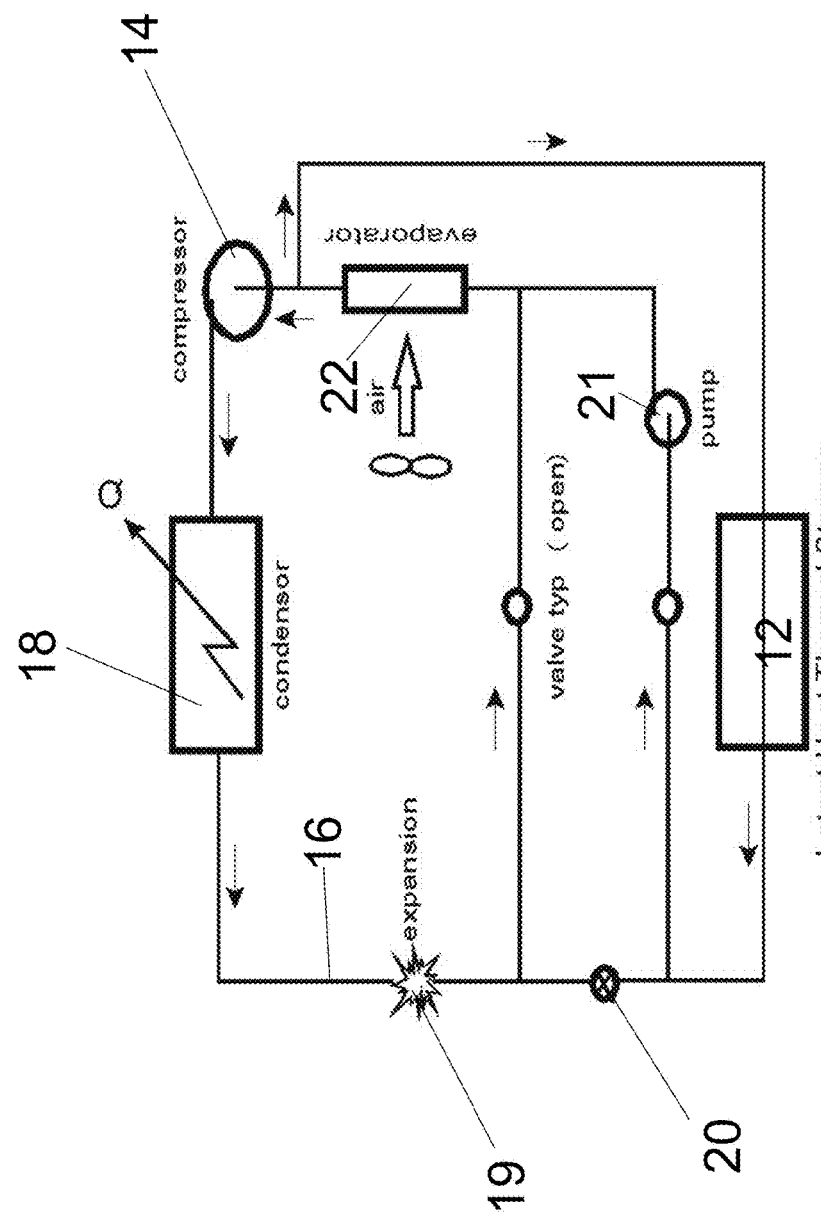
FIG. 2 is a schematic of a low temperature latent heat thermal storage system in discharge mode, in accordance with features of the present invention.

FIG. 2 is a schematic diagram of the system in discharging mode. In discharge mode, the three valves change position causing refrigerant to flow to the evaporator from both the DX system and the latent heat thermal storage component 12. This provides air conditioning from a combination of current electric rates (from the DX system) and night electric rates (from the latent heat thermal storage component). Other configurations of a DX air conditioning system with the latent heat thermal storage component include one where all air conditioning comes from night electric rates.

Still another configuration is one where the storage media component 12 is discharged by building air rather than refrigerant.

In discharge mode, loop fluid direction is reversed such that frozen media residing in the storage media component 12 is contracted by the reverse flowing loop refrigerant. This reverse flowing loop refrigerant acts as a heat sink, thereby extracting heat from the storage module and itself cooling down (condensing in the configuration of FIG. 2). With the first valve 20 now closed, the cooled down reverse flowing loop fluid is routed to an evaporator 22.

The evaporator 22 is the means with which the reverse flowing loop fluid cools ambient air within a building, whereby the liquid is evaporated, extracting heat from the housing of the evaporator 22. A blower 24 forces air about the now cooled housing of the evaporator 22, and through forced air ducts (not shown), routes the now cooled air throughout the structure to be cooled. The DX air conditioning system acts in parallel with the modular, low temperature, thermal energy storage component to supply cold refrigerant to the DX system evaporator for cooling building air. In an alternate configuration, the modular, low temperature, thermal energy storage component may supply all of the refrigerant to the evaporator with the DX system compressor not running. In this alternate configuration, all of the building air conditioning would be supplied using electricity at night time rates.

Part of the now evaporated reverse flow fluid is routed to a condenser 18 and rerouted back to the evaporator to repeat the building-cooling process. The remaining part of the evaporated reverse flow fluid is pumped through the modular, low temperature, thermal energy storage component for cooling (i.e., condensing) before being combined with the fluid from the condenser. (Optionally, a pump 21, in fluid communication with the system conduit 16, may be provided to facilitate both forward and inverse flow of refrigerant through the system.) Both fluid streams flow into the evaporator where building air is cooled. In this configuration, the refrigerant flow (HTF) is divided between the DX system and the modular, low temperature, thermal energy storage component to provide building air conditioning. In an alternate configuration, the DX system and the modular, low temperature, thermal energy storage component could operate independently with separate evaporators.

As discussed below, the system operates with an air handling system of a building.

Figure 3:
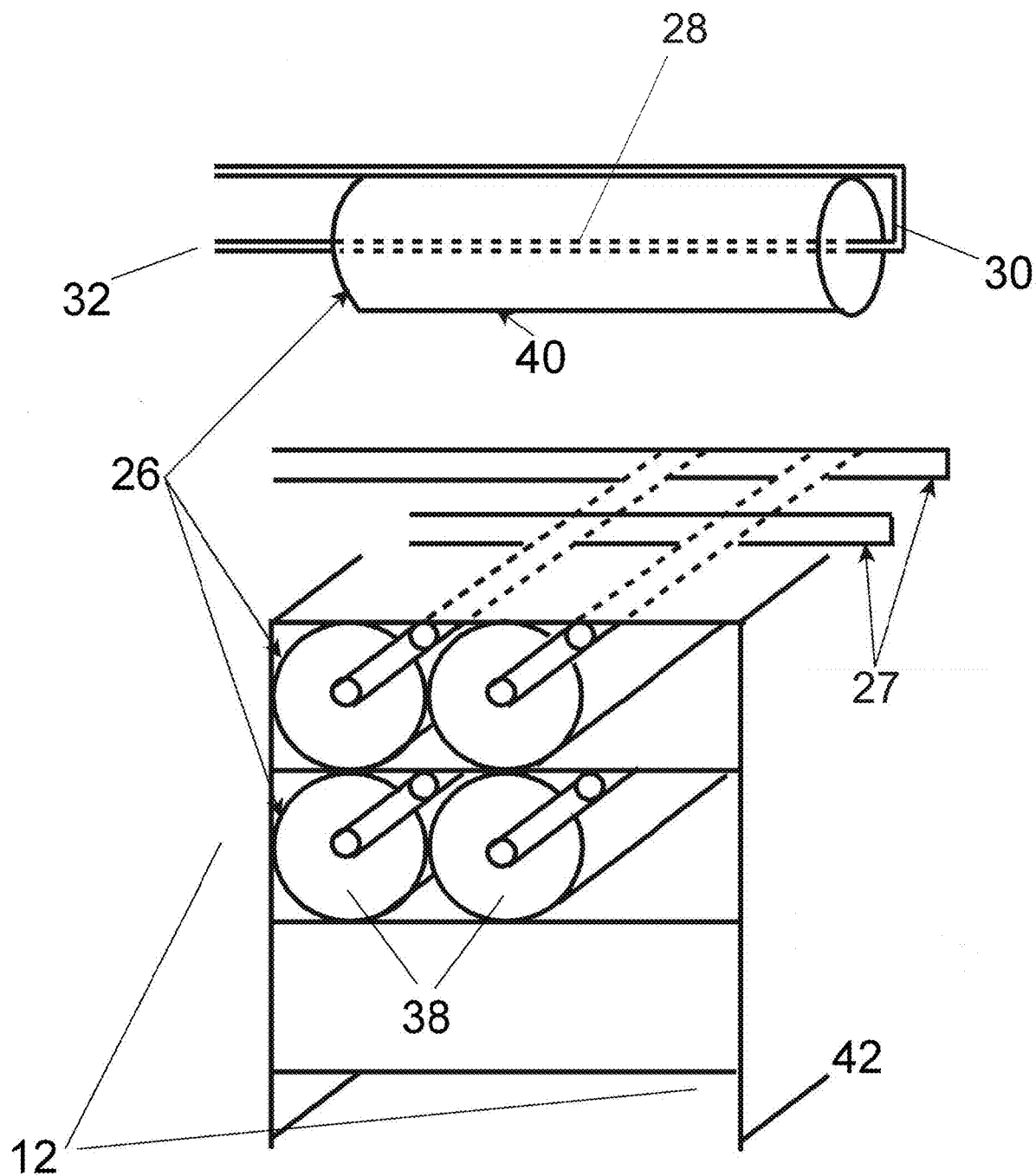
FIG. 3 is a schematic of phase change composite modules, in accordance with features of the present invention.

A salient feature of the invented system is the storage media component 12 comprised of storage modules 26. FIG. 3 is a schematic diagram of the component 12. It is one possible configuration of the phase change composite modules for installation inside a building. The horizontal orientation and the one-sided headers make for ease of installation and maintenance.

FIG. 3 shows several storage media modules 26 contained within the storage media component 12. Each of the modules comprise one or more conduits 28 having a first end 30 and second end 32. These conduits 28 may be initially charged with a manifold system 27. Longitudinally extending regions of the conduit intermediate of its first and second ends are in thermal communication with a phase change composite 38. Most of the longitudinally extending exterior surfaces of the conduit intermediate the first and second ends are encapsulated by the phase change composite 38. Although one conduit 28 per module is shown in FIG. 3, computational fluid dynamics (CFD) computer simulations have shown that, in some circumstances, multiple conduits 28 per module can optimize module cost, efficiency, and volume.

The phase change composite 38 comprises a phase change material 34 homogeneously mixed with a high surface area foam 36. Generally, a suitable porosity of the foam is from about 60 to 90 percent, and preferably from about 80 to 90 percent.

The composite 38 thereby embodies a high latent heat of fusion in small effective volumes given the flexible geometry conferred via the use of the modules 26. (Suitable latent heat of fusion values range from about 100 to about 400 kJ/kg, depending on the PCM utilized. For example, the latent heat of fusion for water is about 334 kJ/kg.) This combines the advantages of large energy storage capacity from the latent heat of fusion of the PCM and the high thermal conductivity of the foam structure with the versatility of the modular configuration. A reduction of costs results for building air-conditioning systems wherein the system is charged when electricity rates are lower (for example at night), and then discharged when energy rates are higher (for example during the afternoon and early evening hours). The composite 38 provides fast charge/discharge rates.

The invented system allows for part-load operation (instead of full-load operation) of a building space cooling system. An example of the configuration of FIGS. 1 and 2 uses a DX system with half the air conditioning capacity compared to the DX system for the building without the use of thermal storage. The thermal storage component is sized to store half the air conditioning load for a day. Then, daytime air conditioning would be provided half each from the DX system and the modular, low temperature, thermal energy storage component. In this example, the DX system would be reduced in capacity by half (reducing capital cost), and it would provide half the air conditioning load with the other half provided by the modular, low temperature, thermal energy storage component (reducing electricity cost). (The modular, low temperature, thermal energy storage component would be charged at night with the half size DX system.)

FIG. 4 contains colored phase transition thermographs of a cross sectional view of a conduit 26 coaxial with PCM. Deep blue color represents the coldest regions of the cross section with gray, orange and red color representing increasingly warmer temperature regions. A relative heat to color scale is positioned along the right margin of the cross section view. X and Y distances depicted along the horizontal and left vertical margins of the thermographs are in meters.

Figure 4A:
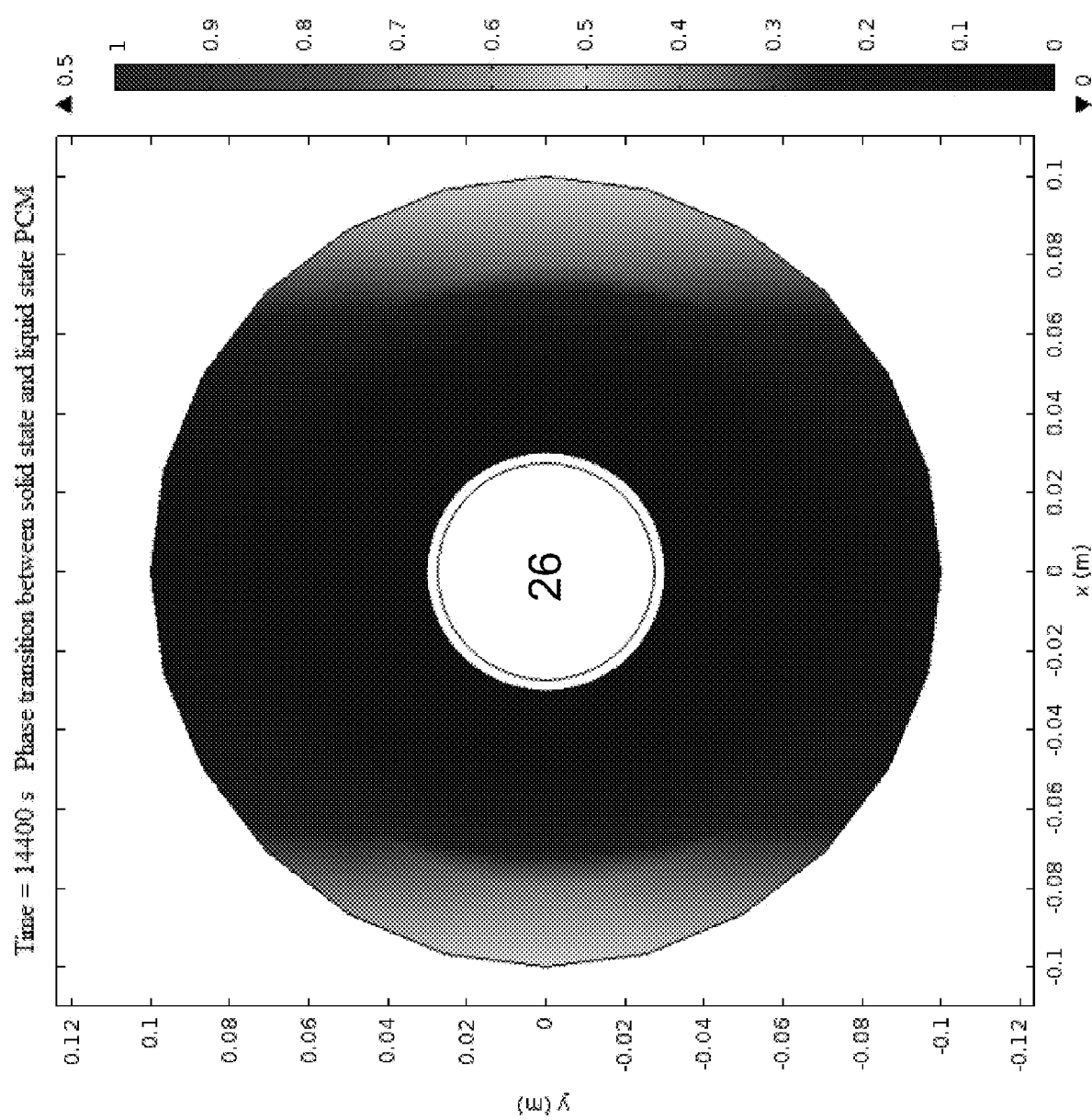
FIG. 4A is a thermograph of a latent heat thermal energy system with water/foam after four hours of charging, in accordance with features of the present invention.

FIG. 4A is a schematic of a latent heat thermal energy system with water/foam after four hours of charging. The nearly solid blue color indicates that the area shown has nearly all been solidified to ice.

Figure 4B:
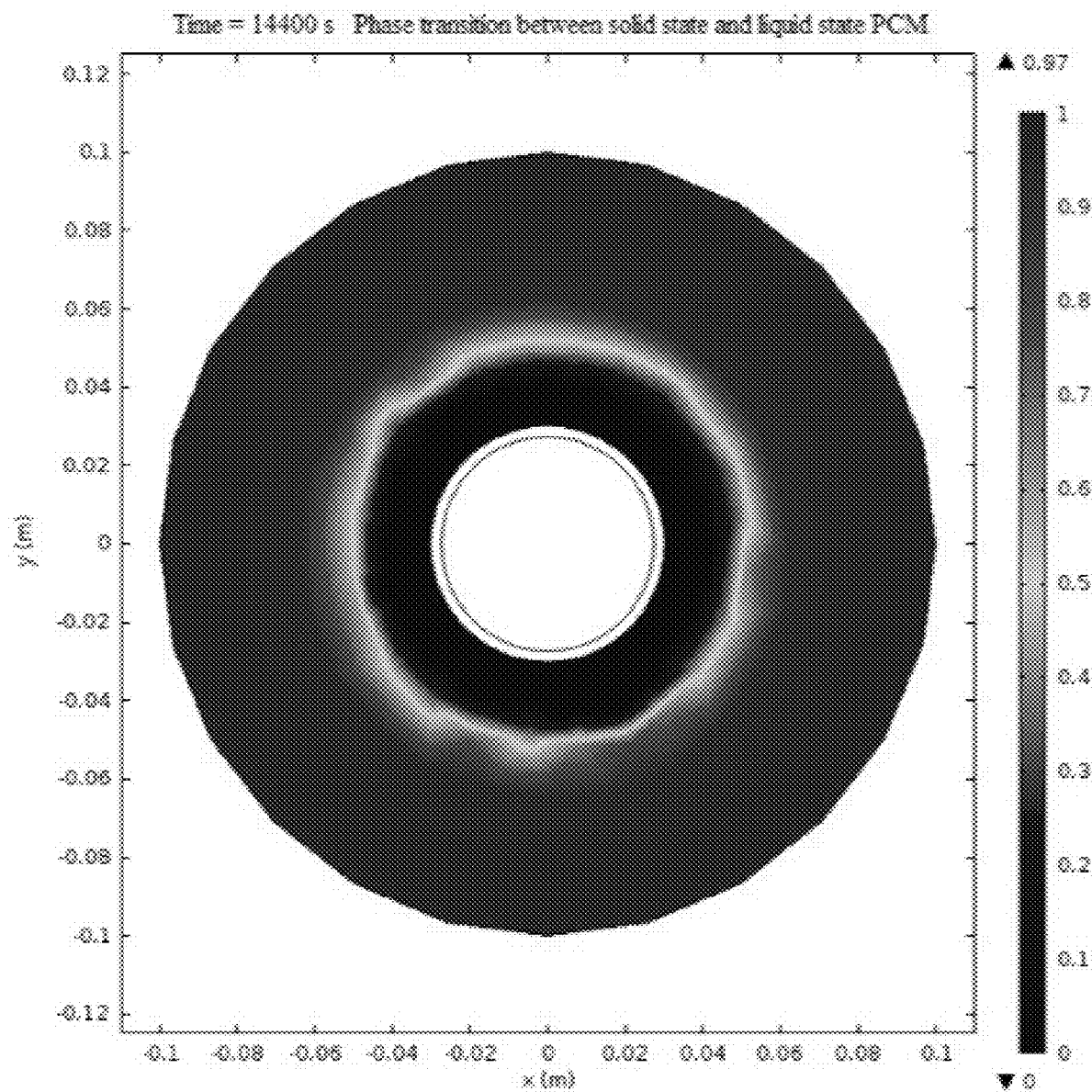
FIG. 4B is shows the ice formation for the same geometry and charging time as FIG. 4A using the state of the art configuration of water and no foam.

FIG. 4B shows the ice formation for the same geometry and charging time as FIG. 4A using state of the art technology of water and no foam. The dark ring near the center is the ice formed after four hours of charging. After 8 hours of charging, the ice formed is only ¼ of the volume formed compared to latent heat storage component that uses the water and foam combination.\

EXAMPLE

FIGS. 4A and 4B are output from computer simulations of the freezing process. In both cases a 2 inch diameter 304 stainless steel pipe was used with a thermal conductivity of 15 W/mK, refrigerant 134a flowing inside at 10° F., and stagnant water outside. Initially, the water was in the liquid state at 32° F. FIGS. 4A and 4B show the amount of ice formed after four hours. In FIG. 4B there was no foam in the water while in FIG. 4A the PCM (water) was encapsulated in a high thermal conductivity foam (maximum thermal conductivity of 77 W/mK) with porosity of 84 percent.

The increase in amount of ice formed is dramatic for the invented foam/PCM construct (FIG. 4A) after 8 hours reaching 400 percent above the no-foam case. While the system dimensions and materials may be changed when optimized for various building air conditioning applications, if water is used as the PCM, the amount of ice formed, as shown in FIGS. 4A and 4B, is typical of the results obtained by the invented method and module.

FIGS. 4A and 4B exemplify the efficiencies of the thermal conducting capabilities of the invented phase change composites 38. The thermograph shown in FIG. 4A shows a nearly uniform thickness of ice extending from the periphery of the phase change module 26. The ice solidification front formed after four hours of thermal contact of evaporating loop-confined fluid through the longitudinally extending axis of the module 26. The dimensions of the ice formed are given in terms of x- and y-axes in units of meters (m). The space allowed for the PCM should be sufficient for complete solidification of the PCM after night time charging (typically eight hours or more).

FIG. 4B is a thermograph of an ice solidification front generated by a conventional ice storage system. Unlike the ice solidification front depicted in FIG. 4A, this conventionally generated ice solidification front is discontinuous. This discontinuity is typical given the insulative properties of ice initially deposited on the periphery of the module 26. As such, regions radially disposed from the periphery of state of the art modules are not solidified during the charging process.

A myriad of phase change materials are suitable for incorporation in the invented system. Generally, the PCM should have a melting temperature between about 0° C. and about 10° C. Exemplary phase change materials include, but are not limited to water, a proprietary material called A4 (from EPS Ltd, Cambridgeshire, UK), proprietary material called 85010-1 (from Witco Corporation, Greenwich, Conn.), proprietary material called RT2 (from Rubitherm Technologies GmbH, Berlin), $Na_2SO_4+NaCl+NH_4Cl+H_2O$ (eutectic), N-Tetradecane (paraffin), $D_2O$, $SbCl_5$ and combinations thereof.

Figure 5:
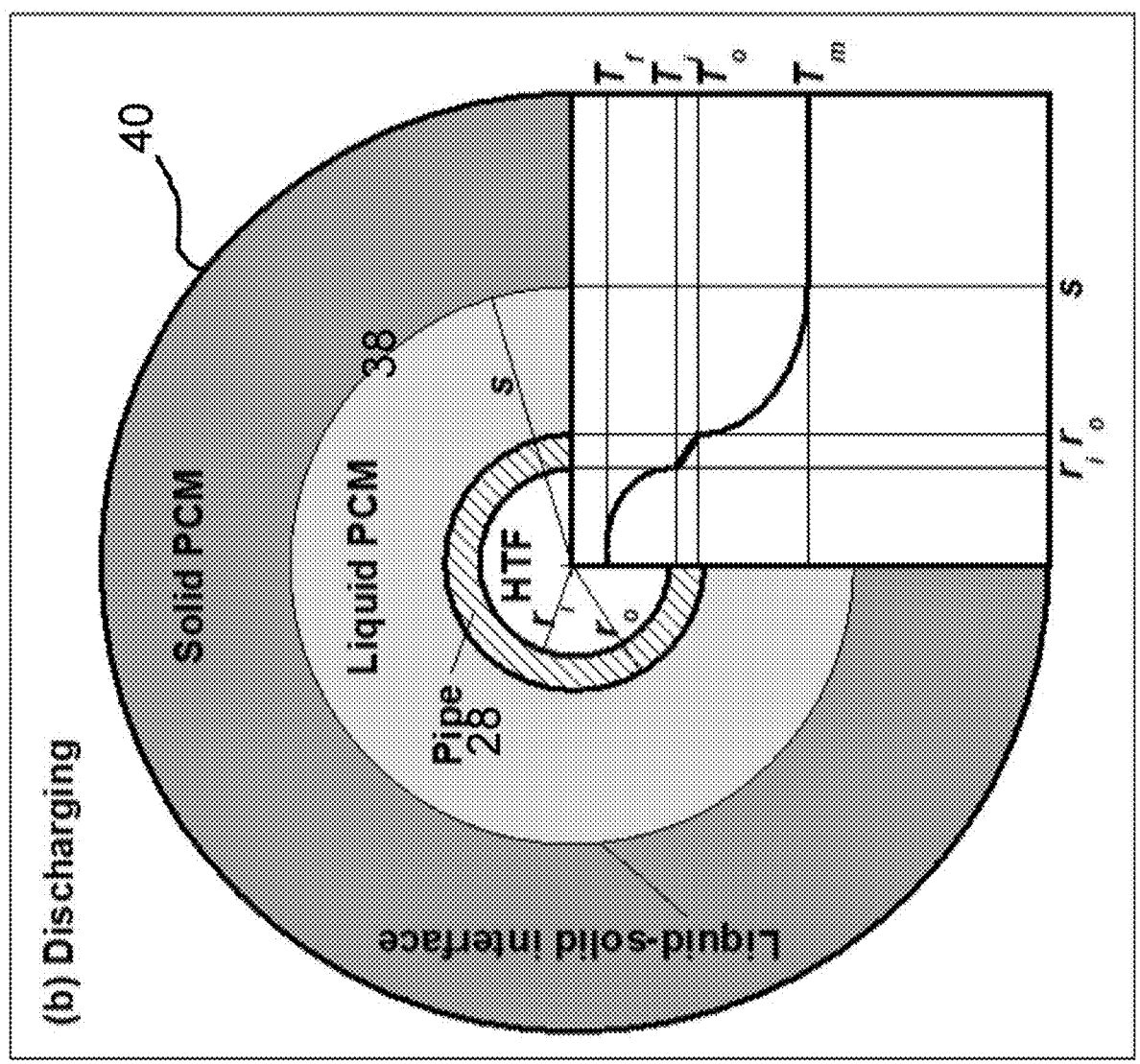
FIG. 5 is a schematic of a cold storage module during the discharge process, in accordance with features of the present invention.

FIG. 5 shows a module 26 during the building cooling (i.e., discharging) process. In this situation, the solid PCM (ice) is at its melt temperature Tm (0 deg C.), and it is being melted by warm heat transfer fluid (HTF) flowing in the pipe. This discharge process produces building air conditioning from the low-temperature latent heat thermal energy storage component that was created (charged) using low, night electric rates.

FIG. 5 shows the temperature distribution from the heat transfer fluid, through the pipe, the liquid PCM/foam combination, and the solid PCM/foam combination. For a direct expansion air conditioning system of the type normally used in homes, the warm refrigerant (heat transfer fluid—HTF) enters the module conduit 28 and is cooled by the melting PCM-foam composite 38. The PCM is at is melt temperature, Tm, and the liquid-solid interface moves outward during the process as more PCM melts to cool the refrigerant. Tf is the HTF temperature in the module conduit 28, and Ti and To are the conduit temperatures at the inside and outside surfaces of the conduit, respectively.

FIGS. 3 and 5 also show a housing 40 with which to sequester the PCM-foam composite 38 within a certain boundary. The housing 40 may hermetically seal the PCM foam composite 38 from the ambient atmosphere such that there is no chemical communication between the composite 38 and the environment external to the housing 38.

FIG. 3 also shows a larger housing 42 in which to sequester a plurality of modules 26. That larger housing 42 may be thermally insulated to enhance efficiencies.

It is to be understood that the above description is intended to be illustrative, and not restrictive. The above-described embodiments (and/or aspects thereof) may be used in combination with each other. For example, the system could be configured to use the stored energy first for air-conditioning and the building's air-conditional second. This example reduces operation cost by using all of the low cost cold storage before any high cost daytime electricity is used to air condition the building.

Another configuration of the system is to only run the building's air-conditioner at night when electric rates are lowest. All of the required daytime cooling capacity would be stored at night in the energy storage component 12. This configuration utilizes the lowest electrical rate all of the time such that it has the lowest operating cost of any configuration.

Still another configuration is to provide air-conditioning and thermal storage simultaneously.

Many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for storing and releasing heat comprising:
  a. confining thermal transfer fluid to a loop;
  b. thermally contacting the thermal transfer-fluid- to a mixture of thermally conductive foam and phase change material for a time sufficient for the material to change from a first phase to a second phase during a time when electricity rates are at a first price point, such that the mixture is stored at about 32 degrees F.;
  c. maintaining said material in the second phase until electricity rates are at a second price point, wherein the second price point is higher than the first price point; and
  d. thermally contacting the thermal transfer-fluid to the material in the second phase for a time sufficient for the material to change back from the second phase to the first phase.

2. The method as recited in claim 1 wherein the phase change material is homogeneously mixed with the foam having a porosity of between about 80 percent and 90 percent.

3. The method as recited in claim 1 wherein the mixture comprises about 80 percent to about 90 percent by volume of phase change material.

4. The method as recited in claim 1 wherein the mixture exhibits a latent heat of fusion of about 100 to 400 kJ/kg.

5. The method as recited in claim 1 wherein the system is installed in a building with an existing air conditioner and the system is used first for air conditioning and the air-conditioner is used second for air conditioning.

6. The method as recited in claim 1 wherein the system is installed in a building with an existing air conditioner and the existing air conditioner is only run when electric rates are lowest.

7. The method as recited in claim 6 wherein the air conditioner charges the system.

8. The method as recited in claim 1 wherein the system is installed in a building with an existing air conditioner which is run simultaneously with the system.

9. The method as recited in claim 1 wherein the fluid is in fluid communication with a compressor and the mixture.

10. The method as recited in claim 1 wherein the fluid is a refrigerant.

11. The method as recited in claim 1 wherein the loop is encapsulated by the mixture.

* * * * *